Figure 1:
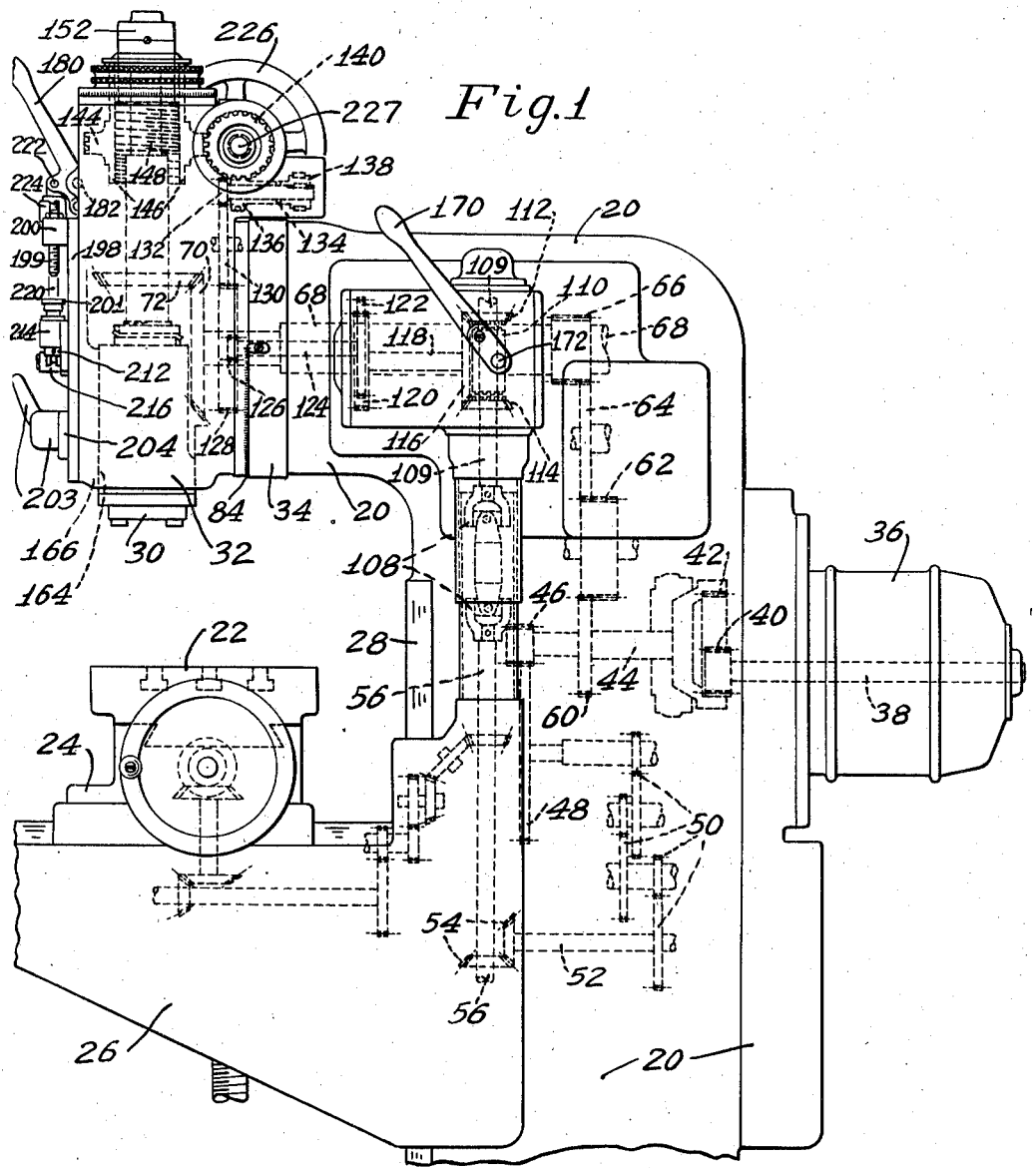

July 14, 1942.　　　　G. B. HIRSCH　　　　2,289,912
MILLING MACHINE
Filed Feb. 23, 1938　　　　3 Sheets-Sheet 1

Inventor
George B Hirsch
by Fish Hildreth
Cary & Jenney attys.

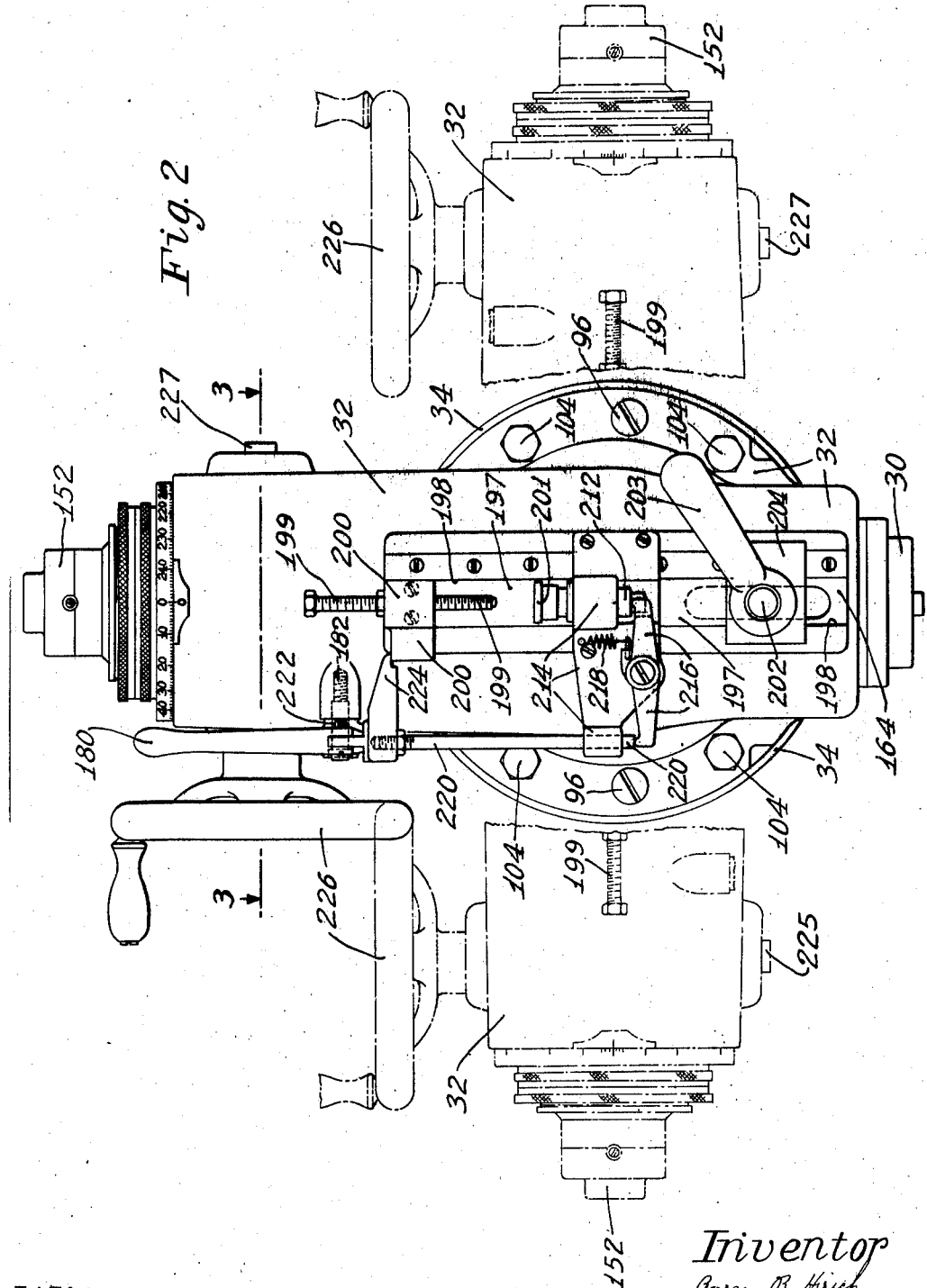

July 14, 1942.　　　G. B. HIRSCH　　　2,289,912
MILLING MACHINE
Filed Feb. 23, 1938　　　3 Sheets-Sheet 3
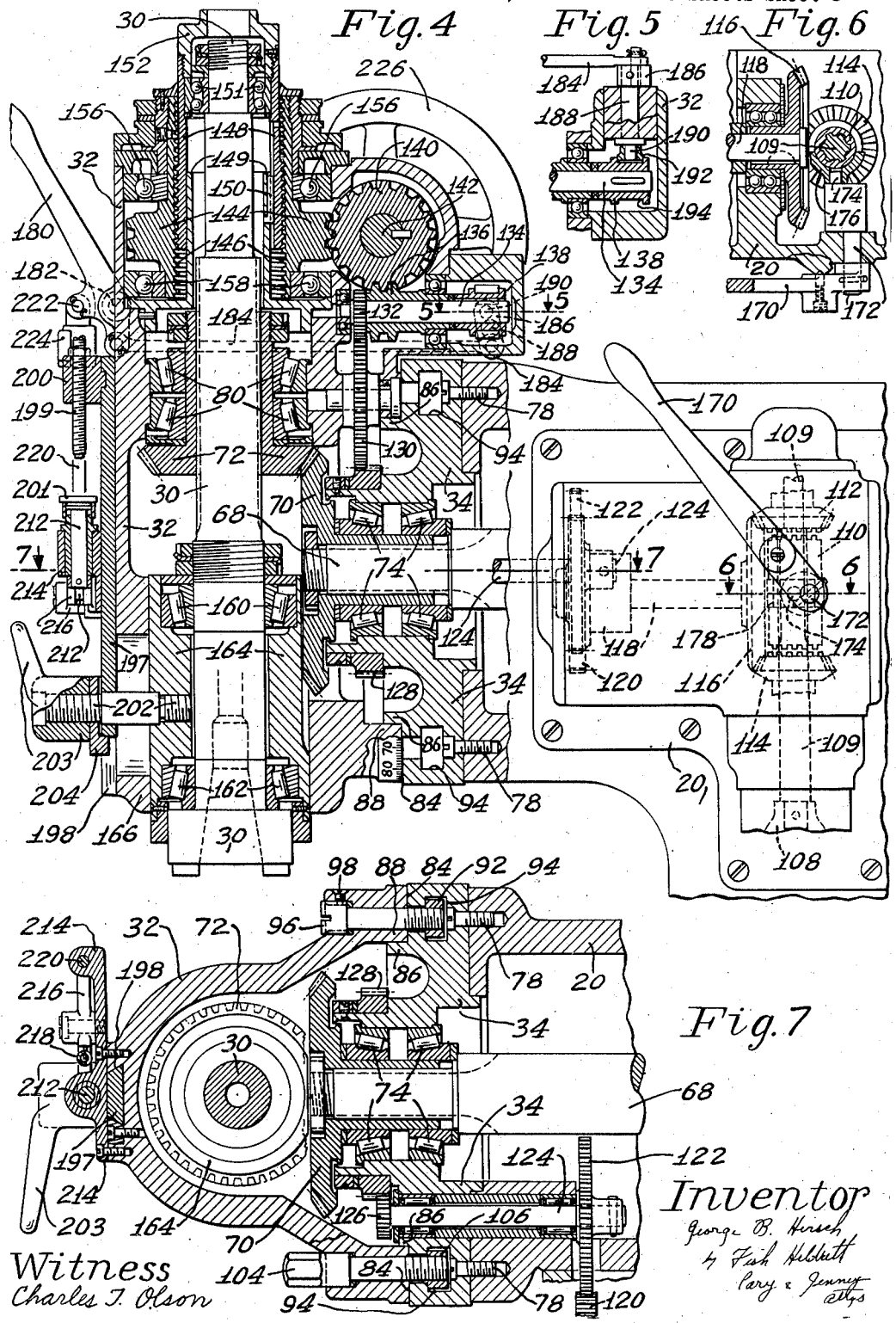

Patented July 14, 1942

2,289,912

UNITED STATES PATENT OFFICE 2,289,912

MILLING MACHINE

George B. Hirsch, Providence, R. I., assignor to Brown and Sharpe Manufacturing Company, a corporation of Rhode Island Application February 23, 1938, Serial No. 191,868

3 Claims. (Cl. 90—17)

The present invention relates to improvements in milling machines, and is herein disclosed as embodied in a vertical type milling machine having a longitudinally reciprocable work table, and a rotary cutter spindle supported for both rotational and axial feeding movements within a spindle head which is carried on a swivel mounting to permit angular adjustment of the spindle and cutter with relation to the work.

In order to provide the greatest possible rigidity of the spindle support and to adapt the machine for satisfactory and efficient operation over a wide range of operating conditions, it has been found desirable to support the spindle in a small compact housing which will require a minimum of space and is capable of the widest possible range of angular adjustment on its swivel mounting. In order to attain these ends, the number of operating parts carried on the spindle head is reduced to a minimum, the spindle drive being taken from an electrical motor or other convenient source of power located on another portion of the machine exterior to the spindle housing.

It is a principal object of the present invention to provide a novel and improved machine of this general description, embodying therein power transmission means for the cutter spindle which originates exterior to the spindle housing, and is well adapted to effect power operation of the spindle both as regards the rotational driving and axial feeding movements thereof, without undue complication of thte driving and controlling connections therefor which might unduly increase the size and weight of the mechanisms supported by the housing, and which will at the same time permit complete freedom in the angular adjustment of the spindle and housing on its swivel mounting in accordance with the requirements of the work which the machine is called upon to perform.

It is more specifically an object of the invention to provide in a machine of this type, transmission means for the spindle, which is adapted to effect power axial feed of the spindle irrespective of the angular adjustment of the spindle and housing on the swivel mounting.

It is another object of the invention to provide in a vertical milling machine of this type, an improved manual feed mechanism for the spindle which is readily accessible to the operator for effecting a manual feed of the spindle independently of the angular adjustment of the spindle on its swivel mounting when set up for operation upon a particular work piece.

With these and other objects in view, as may hereinafter appear, a feature of the invention consists in the provision in a machine of this type, of a novel and improved power drive for the spindle which originates exterior to the spindle head and is transmitted to the spindle through driving connections supported co-axially with the swivel mounting for imparting power feeding or axial movements to the cutter spindle, these connections being constructed and arranged to permit complete freedom of adjustment in the angular adjustment of the spindle and spindle head upon the swivel mounting through 360° of rotation, if so desired.

Another feature of the invention consists in the provision in a machine of this general description, of manual feed mechanism for imparting axial feeding movements to the spindle, which includes a plurality of separate manual driving members located on opposite sides of the spindle housing, and each adapted to have fitted thereto a hand wheel or similar hand tool, whereby the operator is at all times enabled to make a manual adjustment in the axial position of the cutter spindle independently of the angular position of the spindle head on the swivel mounting, and also without interference from any adjacent portion of the work piece which, under certain circumstances, may be located in close proximity to one side or the other of the spindle head.

Figure 3:
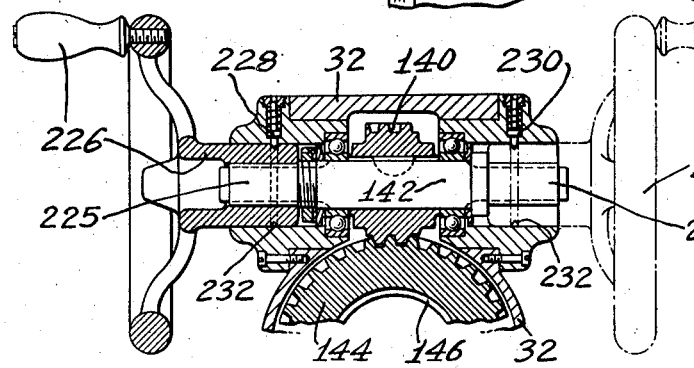

The several features of the invention consist also in the devices, combinations and arrangement of parts hereinafter described and claimed, which together with the advantages to be obtained thereby will be readily understood by one skilled in the art from the following description taken in connection with the accompanying drawings, in which Fig. 1 is a general view in right side elevation illustrating a vertical type milling machine and including the power driving connections for imparting rotational driving and longitudinal feeding movements to the milling cutter spindle; Fig. 2 is a large detail view in front elevation showing particularly the milling cutter spindle head in a vertical position, and also in alternative horizontal positions as indicated in dot-and-dash lines; Fig. 3 is a detail sectional plan view taken on the line 3—3 of Fig. 2, illustrating particularly the manual feed connections for imparting axial feeding movements to the spindle, the hand wheel associated therewith being shown in one position in solid lines, and in its alternative position at the opposite side of the spindle head, in dot-and-dash lines; Fig. 4 is an enlarged sectional view in right side elevation illustrating particularly the rotational and axial feed power drive connections for the milling cutter spindle; Fig. 5 is a detail sectional plan view taken on the line 5—5 of Fig. 4, to illustrate particularly the power feed clutch and control therefor; Fig. 6 is a detail sectional plan view taken on the line 6—6 of Fig. 4, illustrating particularly a reverser in the power feed connections for axially moving the spindle; and Fig. 7 is a sectional plan view taken on the line 7—7 of Fig. 4, to illustrate particularly certain of the driving connections for imparting rotational movements to the milling cutter spindle.

Referring to the drawings, the machine disclosed as embodying in a preferred form the several features of applicant's invention, comprises a vertically extending standard or column 20, a work supporting assembly including a longitudinally reciprocable work table 22, a transversely adjustable saddle support 24, and a knee 26 which is in turn supported for vertical adjustment on ways 28 on the column 20. The machine is also provided with a vertically disposed milling cutter spindle 30 which is supported for rotational and axial movements within a spindle head or housing 32 carried on a swivel mounting 34 on the forwardly extending upper portion of the column 20.

The power drive for the machine is taken from an electric motor 36 secured to the rear side of the column 20 through transmission trains which are connectible to effect power operation of the work table 22 and cutter spindle 30. As best shown in Fig. 1, the rotor shaft 38 of the motor 36 carries on its forward end a pinion 40 which meshes with an internal gear 42 formed on a main drive shaft 44. The drive for the work supporting table is taken from the shaft 44 through a pinion 46, gear 48 and conventional change speed gearing generally indicated at 50, a horizontally disposed shaft 52, and intermeshing bevel gears 54 which drive a vertically extending shaft 56 supported on the column 20. The drive for the table 22 is taken from the shaft 56 through connecting gearing which may be of ordinary description, carried within the knee 26 and saddle support 24. Inasmuch as these connections do not form directly any part of the present invention, further description thereof is believed unnecessary.

The rotational drive for the cutter spindle 30 is taken from the motor driven shaft 44 through connections which include a gear 60 on the shaft 44, intermedate gears 62 and 64, and a gear 66 which is secured to a forwardly extending drive shaft 68 which is supported co-axially with the swivel mounting 34 in the upper portion of the column 20. A bevel gear 70 rigidly secured to the forward end of the drive shaft 68, meshes with a bevel gear 72 sleeved onto and keyed to rotate with the spindle 30. As best shown in Fig. 4 of the drawings, the bevel gear 70 is provided with a sleeve hub which is externally supported in roller bearings 74 carried within the swivel mounting 34. This takes the form of a ring member rigidly secured by means of bolts 78 to the upper portion of the column support 20. The bevel gear 72 is similarly provided with a sleeve hub portion which is externally supported for rotational movement in roller bearings 80 carried on the spindle housing 32. The roller bearings 74 and 80 serve to support the bevel gears 70 and 72 respectively against axial movement to maintain a tight operating engagement between these gears.

As best shown in Figs. 4 and 7 of the drawings, the ring member 34 of the swivel mounting for the spindle head 32 is provided with an annular bearing surface 84 with a raised lip portion 86 for engagement with a correspondingly shaped annular surface 88 formed in the spindle housing 32, these parts being constructed and arranged to permit freedom of adjustment of the spindle housing 32 on its swivel mounting through the full 360° of rotation. The housing 32 including the bearing surface 88 is supported at all times in operative relation to the stationary bearing surface 84 of the swivel mounting, by means of shoes 92 which are fitted within an annular T-shaped slot 94 formed in the stationary surface 84, and adjustably connected by screw bolts 96 to the spindle housing 32. Set screws 98 are provided to maintain the bolts 96 in adjusted angular position to maintain a sliding fit between the bearing surfaces 84 and 88. The spindle housing 32 may be rigidly secured in its adjusted angular position on the swivel mounting 34 by means of clamping bolts 104 which are arranged at spaced intervals to extend within the T-shaped slot 94 into screw-threaded engagement with cooperating clamping members 106. Adjustment of the spindle housing 32 is readily obtained by backing off bolts 104, rotating the spindle housing on its swivel mounting 34 to the desired position, as illustrated, for example, by the dot-and-dash position in Fig. 2, and again tightening the bolts 104 to clamp the spindle housing rigidly against the cooperating stationary member 34 on the column 20.

In accordance with the present invention, applicant provides additional power transmission means originating exterior to the spindle housing 32, and including a driving element located co-axially with the swivel mounting 34 for effecting axial feed adjustments of the milling cutter spindle 30. This mechanism is constructed and arranged to permit of power operation to effect such axial adjustments of the cutter spindle 30 regardless of the angular adjustment of the spindle housing 32, and further to permit of complete freedom in the angular adjustment of the spindle housing on the swivel mounting 34 through 360° of rotation, if so desired. The power drive for effecting axial feed movements of the spindle 30 is taken from the vertically extending shaft 56, driven as previously described from the machine motor 36. The shaft 56 is connected by means of a universal connection 108 with a shaft 109. A reversing clutch member 110 slidably supported upon and keyed to rotate with the shaft 109, is arranged for clutching engagement alternatively with either of two bevel reversing gears 112 and 114 loosely supported to turn on the shaft 109, and meshing with opposite sides of a bevel driven gear 116 carried on the rear end of a forwardly extending drive shaft 118. The shaft 118 also has secured to its forward end a gear 120 which meshes with a gear 122 on an intermediate drive shaft 124, which carries at its forward end a pinion 126 arranged to engage with a gear 128 supported co-axially with the swivel mounting 34. The portions of the driving train, as thus far described, are all supported on the machine column 20. Axial feed movements are imparted to the spindle 30 from the gear 128 through connections which, as best shown in Fig. 4, include an idler gear 130 pivotally supported in the housing 32 to mesh with the gear 128 and with a pinion 132 formed on a clutch shaft 134. The clutch shaft 134 is arranged to drive the spiral gear 136 loosely sleeved to turn thereon, by means of a sleeve clutch member 138 keyed to turn with the shaft 134, and arranged for clutching engagement with the sleeve hub of the spiral gear 136. A second spiral gear 140 keyed to a cross shaft 142 meshes with the spiral gear 136 and with a spiral gear 144 formed on the external periphery of a spindle feed nut 146. The spindle feed nut 146 is arranged for screw-threaded engagement with a cooperating screw-threaded sleeve member 148 which is supported for lengthwise sliding movements upon a stationary sleeve 149 supported coaxially with, but out of contact with the spindle 30. A key 150 secured to the stationary sleeve 149 and fitted for sliding engagement within a slot formed in the sleeve member 148, is arranged to prevent rotational movement of the sleeve 148. The stationary sleeve member 149 is provided at its lower end with an outwardly flanged portion which is rigidly secured to the spindle housing 32. The spindle 30 is supported to be freely rotatable within the sleeve feed member 148, and is connected to be moved axially therewith on a ball bearing 151 interposed between the upper end of the spindle 30 and a cap member 152 screw-threaded to the upper end of the feed member 148. The spiral gear 144 and nut 146 are externally supported in ball bearings 156 and 158 which are arranged to permit rotational but not axial movement of this member in the housing 32.

The spindle 30 is further supported at its lower end within the spindle housing on roller bearings 160 and 162 carried on an axially slidable sleeve bearing member 164, which is in turn slidably supported in a bearing 166 formed in the lower end of the spindle housing 32.

With the construction and arrangement of the mechanism above described, for imparting power axial feeding movements of the spindle 30, it will readily be seen that the operation of this mechanism is independent of the angular adjustment of the spindle head 32 on the swivel mounting 34, and further that these driving connections are so arranged as to permit complete freedom in the angular adjustment of the spindle head 32. As best shown in Figs. 4 and 7 of the drawings, the idler gear 130 meshing with gear 128 co-axially supported with the swivel mounting, is offset from the driving pinion 126 also meshing with the gear 128, so that the gear 130 is permitted during angular adjustment of the spindle head 32 to pass freely by gear 126. If, for example, the spindle housing 32 were to be turned 90° in a clockwise direction on its swivel mounting 34 from the full line position shown in Figs. 1 and 2, the gear 130 will then be located to the right side of the driving gear 128, and immediately in front of the gear 126.

Manual control of the reversing mechanism for the spindle power feed including the reversing sleeve member 110 is obtained by means of a hand lever 170 carried on a pivot shaft 172 (see Figs. 4 and 6) which is supported in a bearing formed in the column 20, and at its inner end carries an eccentric pin 174 engaging with a shifting collar 176 in a peripheral groove 178 in the sleeve clutch member 110. Manual control of the clutch member 138 is effected by means of a manual clutch lever 180 carried on a pivot 182 on the front side of the spindle housing 32. The lever 180 is connected to control the position of the sleeve clutch member 138 by means of a link 184 which is connected at its forward end to a downwardly extending arm of the lever 180, and at its rear end to a lever arm 186 secured to a rock shaft 188 which is provided at its inner end (see Fig. 5) with an eccentric clutch shifter pin 190 engaging with a clutch shoe 192 supported to ride in a peripheral groove 194 on the clutch member 138.

The present machine is provided with mechanism for accurately determining the axial feed adjustment of the cutter spindle 30 and for clamping the spindle 30 in its adjusted position. This adjusting and clamping mechanism, as best shown in Figs. 2 and 4, comprises a slide 197 which is supported in ways 198 on the front of the spindle housing 32, and is connected for longitudinal movement with the spindle 30 and spindle bearing sleeve 164. Accurate adjustment of the downward or feeding movement of the spindle 30 is obtained by engagement of an adjustable stop screw 199 supported in a block 200 on the slide 197 with a relatively stationary stop member 201 on the housing 32. The slide 197 is connected to move with the spindle 30 in the bearing sleeve 164 by means of a clamping screw 202 which passes through a hole in the slide 197, and at its inner end is screw-threaded to the bearing sleeve 164. At its outer end the clamping screw 202 is screw-threaded into the hub of a clamping lever 203 which is seated against a clamping plate 204 supported against adjacent portions of the spindle housing 32. The tightening of the clamping lever 203 operates to clamp the spindle bearing sleeve 164 and the clamping plate 204 tightly against the intervening portion of the housing 32 to lock the spindle 30 in its axially adjusted position.

In the machine herein disclosed, there is also provided mechanism for automatically disconnecting the cutter spindle 30 from power axial feed in either direction. To this end the stop member 201 is formed on the upper end of a plunger 212 supported for axial movement in a stationary block 214 secured to the front side of the spindle housing 32. The plunger 212 and support 201 are normally maintained in a relatively raised position by the engagement therewith of a lever 216 which is normally moved in a counterclockwise direction under the influence of a small tension spring 218. The opposite end of the lever 216 engages beneath a vertically movable link plunger 220 which is slidably supported at its lower end in a bearing formed in the bracket 214, and at its upper end is screw-threaded into a follower member 224 pivotally supported on a pivot pin 222 offset from the rotational axis 182 of the hand lever 180. With this construction and arrangement of parts, it will readily be seen that continued axial downward movement of the cutter spindle 30 carrying with it the slide 197 and stop screw 199 will operate through the lever 216 and link 220 to rock the hand lever 180 to disengage the spindle power axial feed clutch 138.

Power operation of the power axial feed mechanism for the cutter spindle 30 to withdraw the spindle, is similarly automatically arrested through connections which comprise the follower member 224 secured to the vertically extending link 220, which is arranged to be engaged by a lateral extension of the block 200 as the block 200 and slide 197 moving with the spindle 30 reach the limit of their retracting